United States Patent [19]

Yuki

[11] Patent Number: 4,549,216
[45] Date of Patent: Oct. 22, 1985

[54] FOCUSING VOLTAGE OUTPUT CIRCUIT FOR CATHODE RAY TUBE

[75] Inventor: Ikuo Yuki, Yokohama, Japan

[73] Assignee: Hitachi, Ltd., Tokyo, Japan

[21] Appl. No.: 561,069

[22] Filed: Dec. 14, 1983

[30] Foreign Application Priority Data

Dec. 14, 1982 [JP] Japan ................................ 57-217876

[51] Int. Cl.⁴ ............................................. H04N 5/68
[52] U.S. Cl. .................................. 358/242; 315/411; 315/382
[58] Field of Search ................ 358/242, 74, 243; 315/382, 411

[56] References Cited

U.S. PATENT DOCUMENTS 4,198,592  4/1980  Miyoshi et al. .................... 315/382
4,316,128  2/1982  Shiratsuchi ......................... 315/411

Primary Examiner—John C. Martin
Assistant Examiner—E. Anne Toth
Attorney, Agent, or Firm—Antonelli, Terry & Wands

[57] ABSTRACT

In a focusing voltage output circuit for a cathode ray tube, a variable impedance circuit is connected in series with a variable resistor for adjustment of focusing voltage. The impedance of the variable impedance circuit is changed in response to a video luminance signal or a beam current to change the focusing voltage so as to optimize the focus tracking characteristic.

2 Claims, 5 Drawing Figures

FOCUSING VOLTAGE OUTPUT CIRCUIT FOR CATHODE RAY TUBE

BACKGROUND OF THE INVENTION

1. Field of the Invention

This invention relates to a focusing circuit for cathode ray tube (CRT) display which automatically adjusts focusing on an optimized point on a screen of a television receiver set in accordance with brightness and darkness of a picture.

2. Description of Prior Art

FIG. 1 is a circuit diagram showing a prior art focusing circuit for a television receiver set. The focusing circuit comprises a horizontal output transistor 1, a damper diode 2, a resonance capacitor 3, a deflection coil 4, an S distortion correction capacitor 5, a flyback transformer (FBT) 6, an anode voltage (hereinafter referred to as $E_{HV}$) rectifying diode 7, a focusing voltage (hereinafter referred to as $E_F$) rectifying diode 8, an $E_F$ capacitor 9, fixed resistors 10 and 12 for determining a range of change of the $E_F$, a variable resistor 11 for adjustment of the $E_F$, a first output terminal 30 for the $E_{HV}$, a second output terminal 31 for the $E_F$, and a third output terminal 32 connected to a focusing electrode (not shown). The $E_F$ delivered out via the variable resistor 11 is supplied to the focusing electrode of the CRT (picture tube) so as to determine focusing on the screen.

Usually, a focus tracking characteristic of the picture tube (represented by a beam current value in abscissa and a ratio $E_F/E_{HV}$ in ordinate) is determined by a characteristic of the FBT 6. In many applications, the focus tracking characteristic of the FBT 6 is so set that the relation between the beam current of the CRT and the ratio $E_F/E_{HV}$ is always substantially constant as shown in FIG. 2. However, an optimum focus tracking characteristic for a CRT serving as a picture tube of a television receiver set is such that the ratio $E_F/E_{HV}$ changes with the beam current and therefore, the aforementioned characteristic wherein the ratio $E_F/E_{HV}$ is substantially constant relative to the beam current disadvantageously degrades focusing in accordance with changes in brightness and darkness of a picture.

In addition, when a video signal being displayed on the screen contains a white peak signal component representative of a white character, a delay is caused between the $E_F$ and the $E_{HV}$ on account of the capacitor 9, giving rise to defocusing on the screen.

SUMMARY OF THE INVENTION

This invention contemplates elimination of the above prior art drawbacks and has for its object to provide a focusing voltage output circuit which can always realize an optimized focus tracking characteristic irrespective of the focus tracking characteristic of the FBT.

According to this invention, a variable impedance circuit is connected in series with a variable resistor for focusing voltage adjustment, and the impedance of the variable impedance circuit is changed with a video luminance signal or a beam current to change the focusing voltage so that the focus tracking characteristic can be optimized.

DESCRIPTION OF PREFERRED EMBODIMENTS

Figure 1:
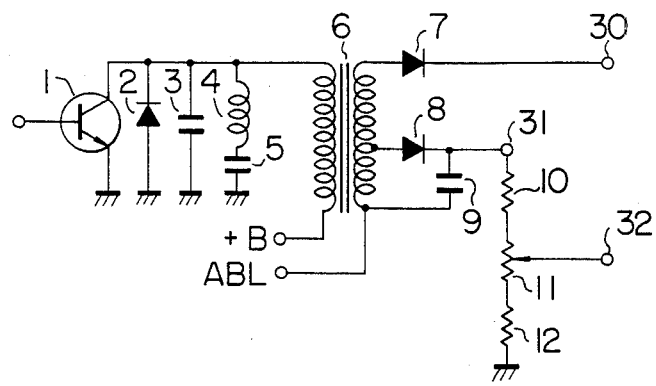
FIG. 1 is a circuit diagram showing a prior art focusing circuit for a television receiver set.
Figure 2:
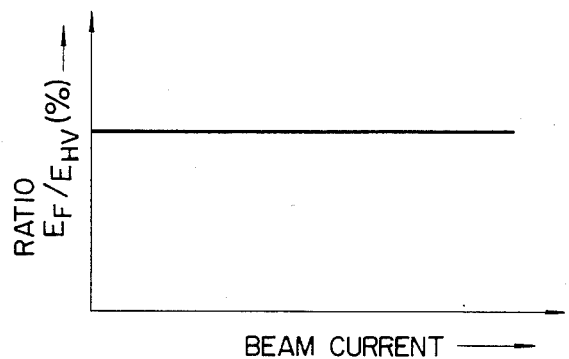
FIG. 2 is a graph showing a focus tracking characteristic in the prior art focusing circuit shown in FIG. 1.
Figure 3:
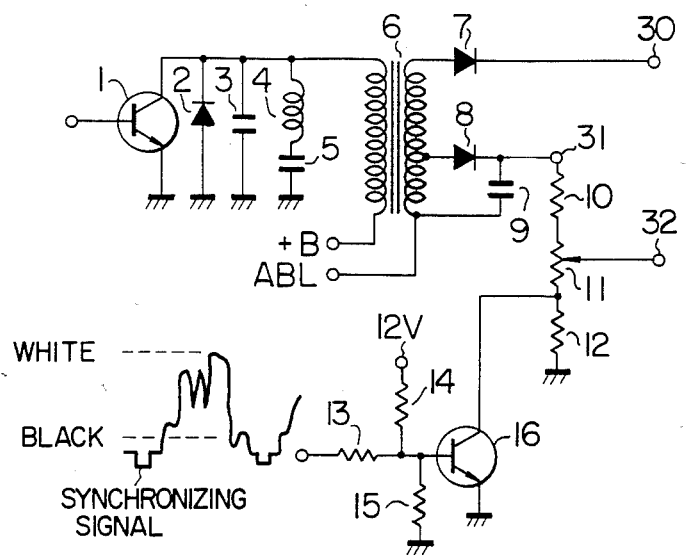
FIG. 3 is a circuit diagram of one embodiment according to this invention.

Referring now to FIG. 3, a preferred embodiment of a focusing voltage output circuit according to the present invention will be described. In FIGS. 1 and 3, like elements are designated by like reference numerals and symbols. Added to the circuit of FIG. 1 are a transistor 16 serving as a variable impedance element, and bias resistors 13, 14 and 15 for the transistor 16.

Figure 4:
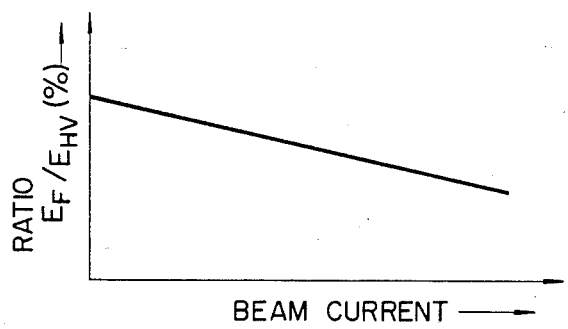
FIG. 4 is a graph showing an example of an optimum focus tracking characteristic for a cathode ray tube (CRT)

In this embodiment, a video luminance signal is used for changing the impedance of the variable impedance element 16. In general, the optimum focus tracking characteristic for the CRT of television receiver set is set so that as the beam current increases, the ratio $E_F/E_{HV}$ decreases as shown in FIG. 4. This embodiment will be described as adapted for such an optimum focus tracking characteristic.

When a luminance signal of negative polarity is applied to the transistor 16 via the resistor 13, base current of the transistor 16 increases in response to a white signal component of higher voltage contained in the luminance signal and the collector/emitter impedance of the transistor 16 decreases. Consequently, collector voltage of the transistor 16 decreases and at the same time, focusing voltage $E_F$ also decreases. In response to a dark signal component of lower voltage contained in the luminance signal, the collector/emitter impedance of the transistor 16 increases to raise the collector voltage of the transistor 16 and the $E_F$. Accordingly, in spite of a characteristic of the FBT 6 wherein both the $E_{HV}$ and $E_F$ decrease as the beam current increases, an ultimate decrease in the $E_F$ taking place in the circuit of FIG. 3 overrides the decrease in $E_F$ due to the characteristic of FBT and as a result, the ratio $E_F/E_{HF}$ can be decreased as the beam current increases.

When an optimum focus tracking characteristic for the CRT is so set that as the beam current increases, the ratio $E_F/E_{HV}$ increases, the application of a luminance signal of positive polarity may obviously meet attainment of the intended result.

Figure 5:
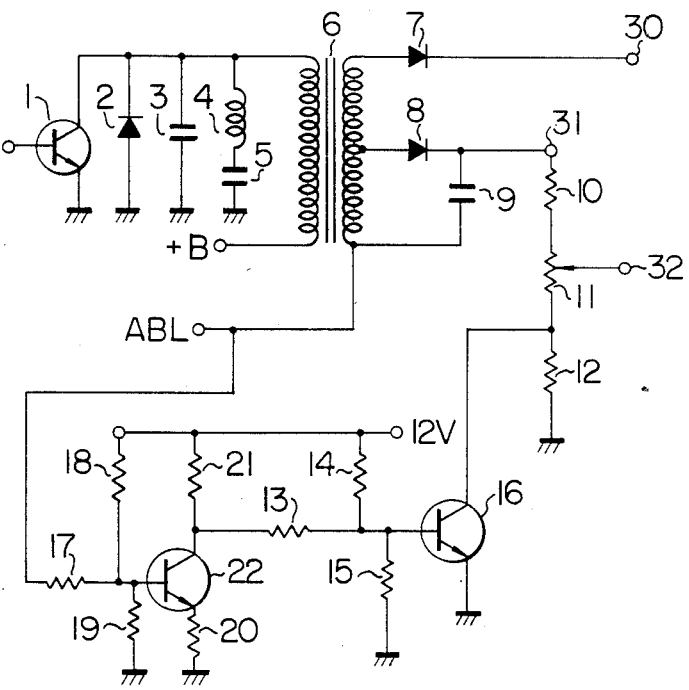
FIG. 5 is a circuit diagram of another embodiment according to this invention.

FIG. 5 shows another embodiment of the invention wherein the $E_F$ is optimized in response to current flowing in the CRT. In comparison with the FIG. 3 embodiment, an inverting amplifier circuit comprising resistors 17, 18, 19, 20 and 21 and a transistor 22 is added. A signal is detected at a terminal ABL. Voltage at the terminal ABL changes with the beam current and in particular, this voltage decreases as the beam current increases. Thus, when the beam current increases, collector voltage of the transistor 22 included in the inverting amplifier circuit increases whereas with the beam current decreased, the collector voltage of the transistor 22 decreases. The transistor 16 is responsive to the changes in the collector voltage to optimize the focusing voltage.

As has been described, according to the invention, the optimum focus tracking characteristic relative to the beam current in the CRT can be obtained by the simplified and inexpensive additional circuit to improve focusing of the television reciever set.

I claim:

1. In a focusing voltage output circuit for a cathode ray tube wherein focusing voltage derived from a flyback transformer having a first output terminal for anode voltage of the cathode ray tube and a second output terminal for the focusing voltage, the improvement which comprises:

an input terminal for receiving a video signal or a beam current flowing in said cathode ray tube; and a variable impedance circuit connected between said second output terminal and a focusing voltage output terminal wherein said variable impedance circuit changes its impedance with a magnitude of said input signal applied to said input terminal.

2. A focusing voltage output circuit according to claim 1, further comprising a variable resistor for adjusting the focusing voltage wherein said variable resister and said variable impedance circuit are connected in series between said second output terminal and said focusing voltage output terminal.

* * * * *